April 29, 1969 L. G. BOUGHNER 3,441,288
STEERING KNUCKLE SEALING MEANS
Filed April 27, 1967

INVENTOR
Lawrence G. Boughner
BY
John R. Bronaugh ATTORNEY

INVENTOR
Lawrence G. Boughner

BY
John R. Bronaugh
ATTORNEY

United States Patent Office 3,441,288
Patented Apr. 29, 1969

3,441,288
STEERING KNUCKLE SEALING MEANS
Lawrence G. Boughner, Birmingham, Mich., assignor, by mesne assignments, to Rockwell-Standard Company, Pittsburgh, Pa., a corporation of Delaware
Filed Apr. 27, 1967, Ser. No. 634,382
Int. Cl. B62; B60g; B60p
U.S. Cl. 280—96.1        11 Claims

ABSTRACT OF THE DISCLOSURE

A king pin sealing means for a steering knuckle of a vehicle steering axle having outer ends formed into bosses. Said steering knuckle having a yoke portion comprising upper and lower arms which receive the axle boss to be pivotally secured thereto by means of a king pin extending through said boss and both of said arms, there being a thrust bearing between the axle boss and the lower knuckle arm to absorb the axle load. Lip type sealing means are provided between the upper steering arm and axle boss and between the axle boss and lower thrust bearing to effectively prevent the entrance of dirt and water and keep lubricant in.

BACKGROUND OF INVENTION

Field of invention

The invention relates to rigid vehicle steering axles such as for instance the front axles in commercial or other type load carrying vehicles, and especially to an axle, steering knuckle and king pin assembly of the reversed Elliot type. In these types of steering axles each axle end is usually provided with a boss portion having a generally vertically extending bore therethrough to receive a king pin which is normally secured therein against rotation. The end portions of the king pin extend out at opposite ends of the boss bore to pivotally receive the upper and lower yoke arms of a steering knuckle straddling the axle boss. The steering knuckle has a wheel spindle extending from the yoke portion adapted to rotatably carry the road wheel and the yoke is equipped to receive steering arms and linkage joints by means of which the steering knuckle may be rotated around the king pin. A thrust bearing is inserted between the lower surface of the axle boss and the upper surface of the lower yoke arm to transmit the axle load to the steering knuckle and bushings or bearing sleeves are provided within the upper and lower yoke arm bores into which the ends of the king pin extend to reduce friction during rotation of the steering knuckle around the king pin ends. For ease of operation and to further reduce friction and prolong the useful life of the bearing sleeves and the thrust bearing these bearings have to be lubricated periodically. A major problem encountered in this type of steering knuckle and king pin assembly has been the inability of effectively sealing the knuckle bearing and king pin bushing to retain the lubricant and to keep out dirt and moisture. As a result, it has been necessary to periodically disassemble the unit, clean the bearing areas and replace worn bearings or bushings if found to be worn to restore faultless and easy steering operations. This procedure has added to the maintenance cost and downtime of the vehicle.

Description of the prior art

In known steering knuckle and king pin structures of this type usually the lower and sometimes also the upper end of the king pin are capped by plugs (such as welsh plugs) inserted within the bores of the steering arms in an attempt to retain lubricant and to prevent entry of foreign matter into the bearing areas of the king pin. Such a structure is disclosed, for instance, in United States Patent No. 1,881,945 for Centralized Lubricating System issued Oct. 11, 1932 to C. F. Raisch. An improved structure provided the replacement of the upper plug with a felt or synthetic seal around the exposed upper end of the king pin and bearing against the upper arm surface as, for instance, shown in United States Patent No. 1,703,630 entitled Bearing issued Mar. 19, 1929 to Woolson or United States Patent No. 2,593,410 entitled Seal issued Apr. 22, 1952 to Buckendale. A further earlier improvement consisted in providing a reversed welsh plug for the lower end of the king pin to prevent the plug from being pressed out of its seat during pressure lubrication and a screwed down cap and gasket assembly for the exposed upper end of the king pin as disclosed in United States Patent No. 2,665,957 entitled Lubricant Seal issued Jan. 12, 1954 to Glander. Although these latter improvements were effective to prevent the entry of contaminants at the upper end of the king pin and prevent the escape of lubricant from the lower end of the king pin there has been, so far, no practical solution proposed to effectively seal the inner open ends of the knuckle arm bores at the thrust bearing between the axle boss and lower knuckle arm and between the upper surface of the axle boss and the upper knuckle arm. Although O-rings have been suggested at the latter location, these proved to be unsatisfactory because of poor sealing and short life due to rapid wear. It has also been proposed to provide resilient seals for the king pin thrust bearing completely covering the thrust bearing and adapted to wipe on the inner upper surface of the lower knuckle arm. However, this surface must usually be left in roughly finished state to assure that the lower race of the thrust bearing which is supported on the surface remains stationary with respect to this surface so that it will be rotated with the steering knuckle. Thus, the roughly machined surface on the knuckle arm against which the sealing lips of the thrust bearing seal of the known prior art rub, quickly causes deterioration of the sealing lips and the effectiveness of the seal is lost rapidly. Such a structure is disclosed in United States Patent 3,294,413 issued Dec. 27, 1966 to Jurosek et al. for Integral Thrust Bearing and Kingpin Bushing Seal.

The upper and lower steering knuckle bores into which the upper and lower ends of the king pin extend are usually provided with plain bushings of metal containing a friction reducing bearing material such as babbit, graphite or the like, or they may be made of a single bearing metal such as bronze. More recently synthetic bushings, such as for instance disclosed in United States Patent No. 3,157,444 issued Nov. 17, 1964 to W. F. Scheel for Slotted Bearing Sleeve With Lubricant Retaining Means have found widespread use because of their good thermal characteristics and low coefficient of friction.

However, whether metal or synthetic bushings are employed, periodic lubrication of the king pin bearing areas will be necessary due to the relatively tight fit between these members since no looseness can be tolerated in the steering assembly although the steering knuckle must be easily rotatable without binding. Nevertheless, prior to the present invention it has been necessary to periodically disassemble the steering knuckle units to clean the bearing areas of the king pin and possibly regrind or polish these surfaces as well as replace worn bushings at relatively high expense in addition to the down time of the vehicle. It has been found that this is due exclusively to inadequate sealing of the bushing areas, especially at the inner locations between the steering knuckle and axle boss surfaces allowing the lubricant to leak out and contaminants to enter the bearing areas. The grit like minute particles of the contaminants entering the bearing areas pitted the bearing surfaces and caused their gradual deterioration. Attempts have and are being made to develop new bearing materials to replace the presently known bushings in an attempt to seek prolonged life for these bushings. However, extensive tests in connection with the present invention proved conclusively that the real key to better bushing performance and prolonged life resides in improving the sealing means to keep water and contaminants out and the lubricant in. This has been accomplished with the sealing means of the present invention. As a result, bearing performance has been improved and the useful life of the conventional bushings has been considerably extended at much less cost than that necessary to develop and substitute more expensive bearing materials.

SUMMARY OF INVENTION

The present invention provides novel sealing means at the surfaces between the axle boss and the steering knuckle to eliminate the above stated disadvantages of the prior art by the provision of lip type radial seals adapted to wipe at one location on the outer king pin or king pin bushing surface and at the other location on the outer surface of the thrust bearing shield, both of said surfaces of rotation being smoothly finished surfaces which will not frictionally damage the edges of the sealing lips so that a tight sealing contact is maintained at all times. In the present novel king pin sealing construction the seal between the upper knuckle arm and upper surface of the axle boss may be inserted and retained in a counter bore of the upper knuckle arm to be rotated therewith whereas the seal between the lower surface of the axle boss and the king pin thrust bearing may be stationarily retained by the axle boss allowing the thrust bearing shield to rotate within the seal.

Accordingly, it is the primary object of the present invention to provide a novel king pin sealing arrangement for a steerable vehicle axle in which lip type wiper seals are provided adjacent the inner ends of the king pin bores in the knuckle arms to seal the abutting, relatively rotating surfaces between the axle boss and the king pin bearing areas.

Another object resides in the provision of novel sealing arrangements for a king pin and steering knuckle assembly to retain lubricant and effectively prevent the entrance of contaminants and fluid into the bearing areas of the king pin by sealing off the inner openings of the king pin bores in the steering knuckle yoke against the intermediate axle boss.

Other objects and novel features will become readily apparent by reference to the appended claims and by the following detailed description in connection with the accompanying drawings.

DESCRIPTION OF PREFERRED EMBODIMENT

Figures 1, 1A, 2:
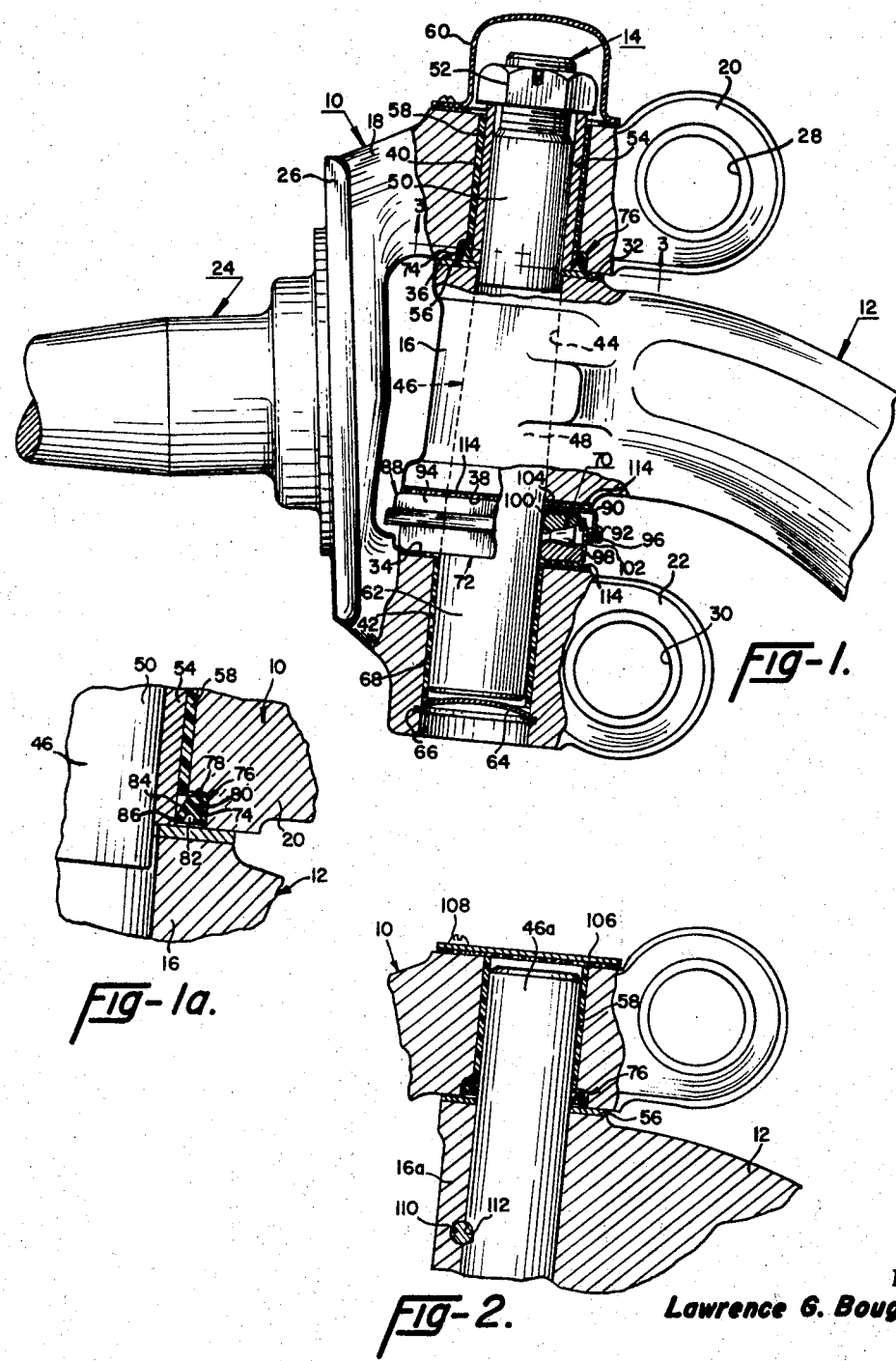
FIG. 1 is a side view in elevation and partly in cross section illustrating a steering knuckle and tapered king pin assembly embodying the present novel sealing arrangement.
FIG. 1a is an enlarged view of the upper king pin sealing arrangement.
FIG. 2 is a fragmentary view similar to FIG. 1 showing the application of a straight sided king pin.
Figure 3:
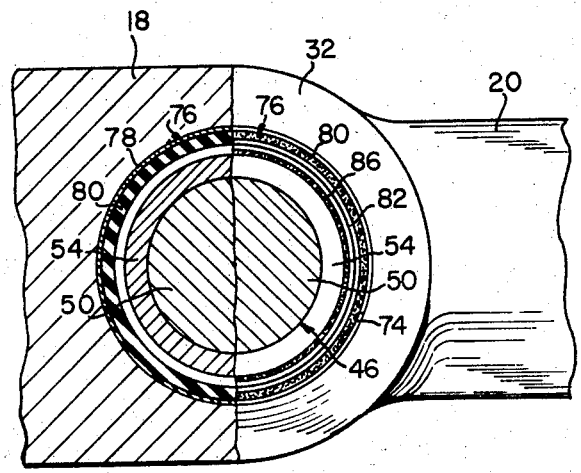
FIG. 3 is a cross section through the upper portion of the king pin in FIG. 1 along line 3—3 thereof.

With reference to the drawings there is illustrated in FIGURE 1 a steering knuckle 10 such as may be employed in connection with a rigid front steering axle 12 for motor vehicles to which the knuckle is pivotally connected by a king pin assembly 14 for rotation around a substantially vertical axis.

The axle and steering knuckle assembly illustrated herein is of the reversed "Elliot" type, that is, the axle 12 is provided at its outer ends with a bossed portion 16 and the steering knuckle 10 has a yoke portion 18 having spaced upper arm 20 and lower arm 22 which receive the axle boss 16 in between them. Obviously, an "Elliot" type axle may be employed in which the axle outer end has a yoke portion and the steering knuckle a boss extending within the axle yoke, such as for instance shown in the aforesaid patent to Woolson.

The steering knuckle 10 is further provided with a spindle portion 24 adapted to carry a road engaging wheel (not shown) and extending in opposite direction from the yoke portion 18 divided therefrom by a flange 26 which provides on its outer face attachment and support for a brake support mounting (not shown) as is customary. The extreme ends of the yoke arms 20, 22 are provided with apertures 28 and 30 for recipt of the steering linkage rod joints (not shown) as is known.

The adjacent inner planar surfaces 32 and 34 respectively of the upper and lower yoke arms 20 and 22 respectively are parallel to each other and to the opposite upper and lower planar surfaces 36 and 38 respectively of the axle boss 16 and both of the yoke arms 20, 22 and axle boss 16 are provided with generally vertically extending coaxial bores 40, 42 and 44 respectively which, in assembly, will be axially aligned to receive a king pin 46 around which the steering knuckle 10 is adapted to rotate. The king pin 46 is non-rotatably retained within the axle boss bore 44, the axle boss bore 44 being slightly conically tapered to receive in a tight wedge fit the complementarily tapered midportion 48 of the king pin 46 to thus restrain it from rotation.

The cylindrical upper portion 50 of the king pin 46 extends into and through the upper yoke arm bore 40 and its outwardly extending end is provided with threads to receive a locknut 52 by which the king pin is drawn up tight in the tapered axle bore 44. A cylindrical sleeve 54 is fitted tightly around the upper portion 50 of the king pin to compensate for the reduced diameter at this end. The lower end of the sleeve 54 abuts against a thrust bearing washer 56 the outer margin of which lies between the surfaces 32 and 36 of the upper yoke arm 20 and axle boss 16, respectively. The upper end of the sleeve 54 is engaged by the lock nut 52 so that, when lock nut 52 is tightened against the sleeve 54, the king pin 46 is drawn upwardly and wedged in bore 44.

Fitted within the bore 40 of the upper yoke arm 20 is a bushing 58 surrounding the sleeve 54. Bushing 58 may be of any known bearing metal or other bearing material but preferably is of a synthetic material and of such configuration as shown in the aforementioned U.S. Patent No. 3,157,444 to W. F. Scheel. The bushing 58 facilities free rotation of the upper yoke arm 20 around the king pin. A suitable lubricant fitting (not shown) may be provided to lubricate the bearing surfaces of the bushing 58, bore 40, and sleeve 54.

The upper end of the king pin together with the lock nut 52 is enclosed in a removable cover gasket assembly 60 to prevent the entrance of dirt and water into bore 40 from the upper end.

The cylindrical lower end 62 of the king pin extends within bore 42 of the lower yoke arm 22 and the outer end of the bore 42 is closed by a reversed welch plug 64 retained in bore 42 by a lock ring 66. Plug 64 provides an effective pressure lubricant seal in accordance with the disclosure in the aforesaid Patent No. 2,665,957 to Glander to which further reference should be had.

To allow easy, free rotation of the lower yoke arm 22 around the king pin, the bore 42 is likewise fitted with a bushing 68 which may be of the same material and substantially identical to the upper bushing 58. Similarly, a lubricant fitting (not shown) may be provided at this end to provide the bearing area between the bore 42, king pin 14, and bushing 68 with lubricant.

In order to absorb the axle load, a thrust bearing 70 enclosed within a two part shell 72 is provided between the surface 34 on the yoke arm 22 and surface 38 on the axle boss 16. The thrust bearing 70 is preferably an antifriction roller bearing as shown or a ball bearing. The lower race of the thrust bearing 70 which is supported on the yoke arm 22 rotates with the yoke arm whenever the steering knuckle 10 is rotated.

The lower end of the bore 40 in the upper yoke arm 20 is counterbored at 74 to receive an annular seal assembly 76 pressfitted therein. Seal assembly 76 comprises a retainer or back-up ring member 78 of sheet metal or the like extending underneath the bushing 58 and in which is bonded or otherwise secured an annular sealing element 80 of resilient material such as rubber, neoprene or the like. Sealing element 80 is provided with a circumferential groove 82 between the retainer 78 and the inner diameter to provide a flexible annular sealing lip 84 having an edge portion 86 adapted to circumferentially abut the smooth cylindrical surface of the sleeve 54 in tight sealing contact.

Figure 4:
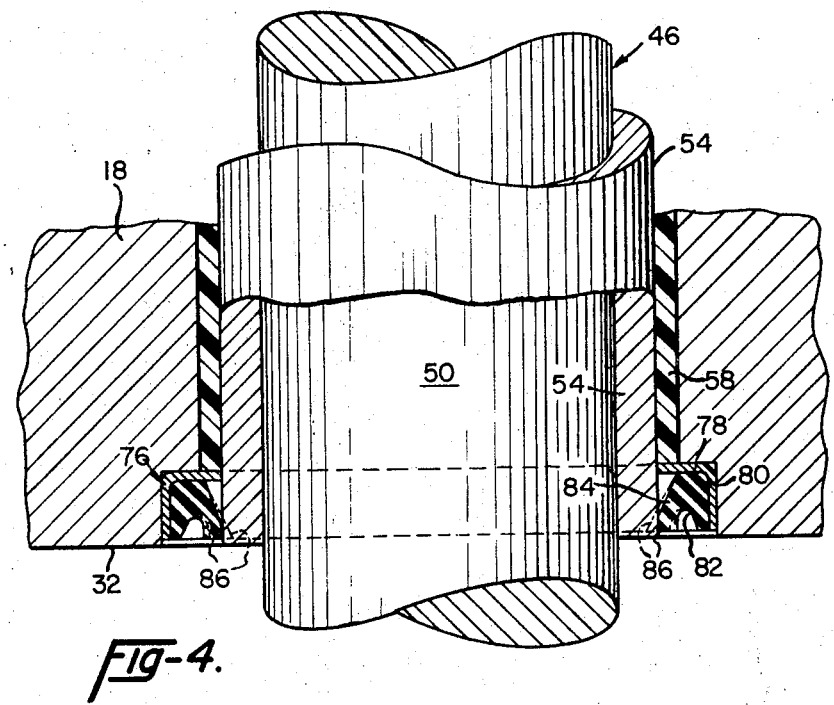
FIG. 4 is an enlarged schematic view illustrating the sealing relationship between the king pin and the sealing lip of the present novel seal.

As more clearly illustrated in FIG. 4 the inner diameter of the edge portion 86 of the sealing element 80 is normally (that is, in relaxed position) slightly smaller than the outer diameter of the sleeve 54 in FIG. 1 as indicated in broken lines so that when the sleeve is pushed through the seal the sealing lip 84 will be resiliently expanded and flexed radially by the provision of the groove 82 adjacent the sealing lip. By this arrangement an expansion force will be set up in the sealing lip 84 since the lip tends to restore its original diameter thereby tightly pressing the sealing edge 86 against the king pin or sleeve surface and thus effectively sealing the bore 40. As can be seen from the figures, since the edge of the sealing lip is directed outwardly and is under steady compression, no water or road dirt will be able to penetrate to the bearing surfaces of bushing 58.

Since the seal assembly 76 is press fitted within the counterbore 74 it will rotate with the yoke arm 20 whenever the steering knuckle 10 is rotated. The edge 86 of the sealing lip 84 slides rotatably around the sleeve surface, there being practically no wear on the seal lip since this surface is smoothly ground and free of any ragged protrusions. The load on the seal is constant at the designed magnitude determined by the dimension and material of sealing element 80 and the outside diameter of the sleeve 54.

A similar seal assembly 88 is provided at the lower yoke arm 22 between the axle boss 16 and the thrust bearing 70. The seal assembly 88 comprises likewise a sheet metal retainer or back-up member 90 containing an annular sealing element 92 which while differing in size is identical in configuration to sealing element 80. The retainer 90 is fitted around king pin 46 by means of an upwardly protruding portion 94 which is retained between the lower surface 38 of the axle boss 16 and the upper half of shell 72 of the thrust bearing 70. The wall of retainer 90 diverges from the portion 94 and fits around the shell 72 of the thrust bearing so that the sealing lip 96 of the sealing element 92 will be in contact with the outer surface of the outer or lower shell half 98 of the thrust bearing shell 72. It thus sealingly bridges the space between the outer or lower shell half 98 and inner or upper shell half 100 of the thrust bearing 70.

Due to the load imposed by the axle 12 upon the thrust bearing 70, the inner shell member 100 together with the seal assembly 88 remains stationary relative to the axle 12 whereas the outer shell member 98 together with the lower bearing race rotate with the lower yoke arm 22 whenever the steering knuckle 10 is being rotated. Thus, the outer surface of the outer shell member 98 slidingly rotates within the seal 88 along the edge portion 102 of the sealing lip 96. Lip 96 is compressed thereagainst as previously described in connection with seal 76. The outer surface of the shell 98 as stated previously provides a smooth surface for the sealing lip 96 to eliminate any material wear on the sealing edge 102. Here likewise the sealing lip is directed outwardly to effectively prevent the passage of water and other contaminants into the thrust bearing 70. Similarly, there is practically no load applied to the seal 88 the axle load being applied to the flat portion 104 of the retainer 90 which acts as a washer between the axle boss 16 and thrust bearing 70 and is remote from the actual sealing element 92 so that no load will be transferred thereto.

In most instances there will be no sealing problem between the surface of the outer bearing shell member 98 and the yoke arm surface 34 or seal retainer 90 and surface 38 at the axle boss 16 since there is no relative rotation between these surfaces and the applied axle load keeps those surfaces in tightly abutting relationship. For added protection, however, a thin film of a sealing compound may be applied to these surfaces or, alternatively, rubberized fabric washers 114 as shown in FIG. 1 may be placed between these surfaces to prevent any seeping of moisture along these surfaces.

In the embodiment of FIGURE 2, the upper seal 76 directly engages the cylindrical portion of the king pin 46a, the compensating sleeve 54 being omitted from the bore 40. In this embodiment, the king pin 46a is directly journalled within the bushing 58. The upper open end of the bore 40 in this instance is closed by a flat plate and gasket assembly 106 attached to the yoke arm 20 by means of screws 108. To retain the straight king pin 46a within the axle boss 16 and against rotation a pin like key 110 is inserted within a tangential groove 112 of the king pin and an opposite groove within the axle boss.

The sealing arrangement in the latter king pin structure is otherwise identical to that shown in FIGURE 1 and need not be repeated.

Thus, by the present invention a novel sealing arrangement is provided in a steering knuckle and king pin assembly. It effectively seals the thrust bearing and the inner ends of the yoke arm bores between the steering knuckle and the axle boss or yoke. It is so constructed that no excessive frictional wear is created at the resilient sealing lips to maintain their effectiveness substantially indefinitely. With the present novel sealing arrangement the useful life of the presently used king pin bushings and thrust bearings is considerably prolonged.

What is claimed and desired to be secured by United States Letters Patent is:

1. In a steering knuckle and king pin assembly for a vehicle steering axle, an apertured axle boss, a king pin extending through and fixed to said axle boss, said king pin having upper and lower pivot portions extending out of said axle boss, a steering knuckle having a yoke portion straddling said axle boss, said yoke portion having aligned first and second bores into which said king pin pivot portions extend, bushings in said bores to facilitate rotation of said steering knuckle around said king pin pivot portions, closure means to close the open ends of said bores, a thrust bearing between said axle boss and a lower portion of said yoke and first and second sealing means at opposite sides of said axle boss to sealingly close the lower end of said first bore and said thrust bearing respectively, said sealing means each comprising an annular retainer, an annular sealing element carried by said retainer having a downwardly facing resilient annular sealing lip providing at the bottom thereof an annular edge portion, said annular edge portions of said first and second sealing means being in sealing contact with smooth coaxial annular surfaces around and fixed with respect to said king pin and said thrust bearing respectively.

2. In the assembly defined in claim 1 in which said smooth annular surface around said king pin is on a sleeve surrounding and fixed to said king pin upper pivot portion.

3. The assembly defined in claim 1 in which one of said sealing elements is fixed for rotation with said steering knuckle around the axis of said king pin.

4. The assembly defined in claim 1 in which one of said sealing elements is fixed relative to said axle boss.

5. The assembly defined in claim 1 in which said smooth annular surface around said thrust bearing is a portion of a shell enclosing said thrust bearing.

6. The assembly defined in claim 5 wherein said portion of said shell of said thrust bearing is fixed to said steering knuckle.

7. The combination defined in claim 1 wherein said annular sealing lip is wedge shape in cross-section, the wedge shape being defined by a substantially planar bottom surface of said sealing element normal to the king pin axis and a substantially conical surface coaxial with the king pin axis and diverging from said smooth annular surface.

8. The combination of claim 1 wherein said smooth annular surfaces are cylindrical.

9. The combination defined in claim 1 wherein said sealing element surrounds said smooth annular surface.

10. In a vehicle steering assembly including an axle, a steering knuckle having a yoke portion comprising upper and lower yoke arms straddling a portion of said axle, a king pin assembly, aligned bores in said yoke arms and said axle receiving said king pin assembly whereby said steering knuckle is pivotally mounted on said axle by said king pin assembly, the bore in said upper yoke arm and the outer surface of the portion of the king pin assembly within said bore in said upper yoke arm being generally cylindrical and at least the cylindrical surface of the king pin assembly being smoothly finished, the lower end of said bore in said upper yoke arm being counterbored, a seal within said counterbore in a fixed position relative to said upper yoke arm for rotation with said steering knuckle, said seal having a resilient sealing lip projecting radially inwardly and axially downwardly relative to said king pin assembly to resiliently sealingly engage only said cylindrical smoothly finished surface of said king pin assembly.

11. In the steering assembly defined in claim 10, a thrust bearing separating said axle and said lower yoke arm, a seal non-rotatively retained between said axle and said thrust bearing, said seal comprising a flanged retainer, said flange extending over part of said thrust bearing, a sealing element supported in said flange of said retainer having a flexilbe sealing lip adapted to sealingly contact a radial outer surface of said thrust bearing.

References Cited

UNITED STATES PATENTS

| | | | |
|---|---|---|---|
| 2,076,747 | 4/1937 | Salisbury | 277—35 |
| 2,449,306 | 9/1948 | Leighton | 280—96.1 |
| 2,613,960 | 10/1952 | Nelson | 277—38 |
| 2,665,957 | 1/1954 | Glander | 280—96.1 X |
| 2,868,562 | 1/1959 | Heimbuch | 277—38 |
| 3,294,413 | 12/1966 | Jurosek et al. | 280—96.1 |
| 3,300,230 | 1/1967 | Spencer | 280—96.1 |
| 3,320,006 | 5/1967 | Cozzarin | 308—36.1 |
| 3,342,507 | 9/1967 | Koch et al. | 280—96.1 |
| 3,367,666 | 2/1968 | Symons | 277—40 |

KENNETH H. BETTS, *Primary Examiner.*

U.S. Cl. X.R.

308—36.1, 120